Figure 1:
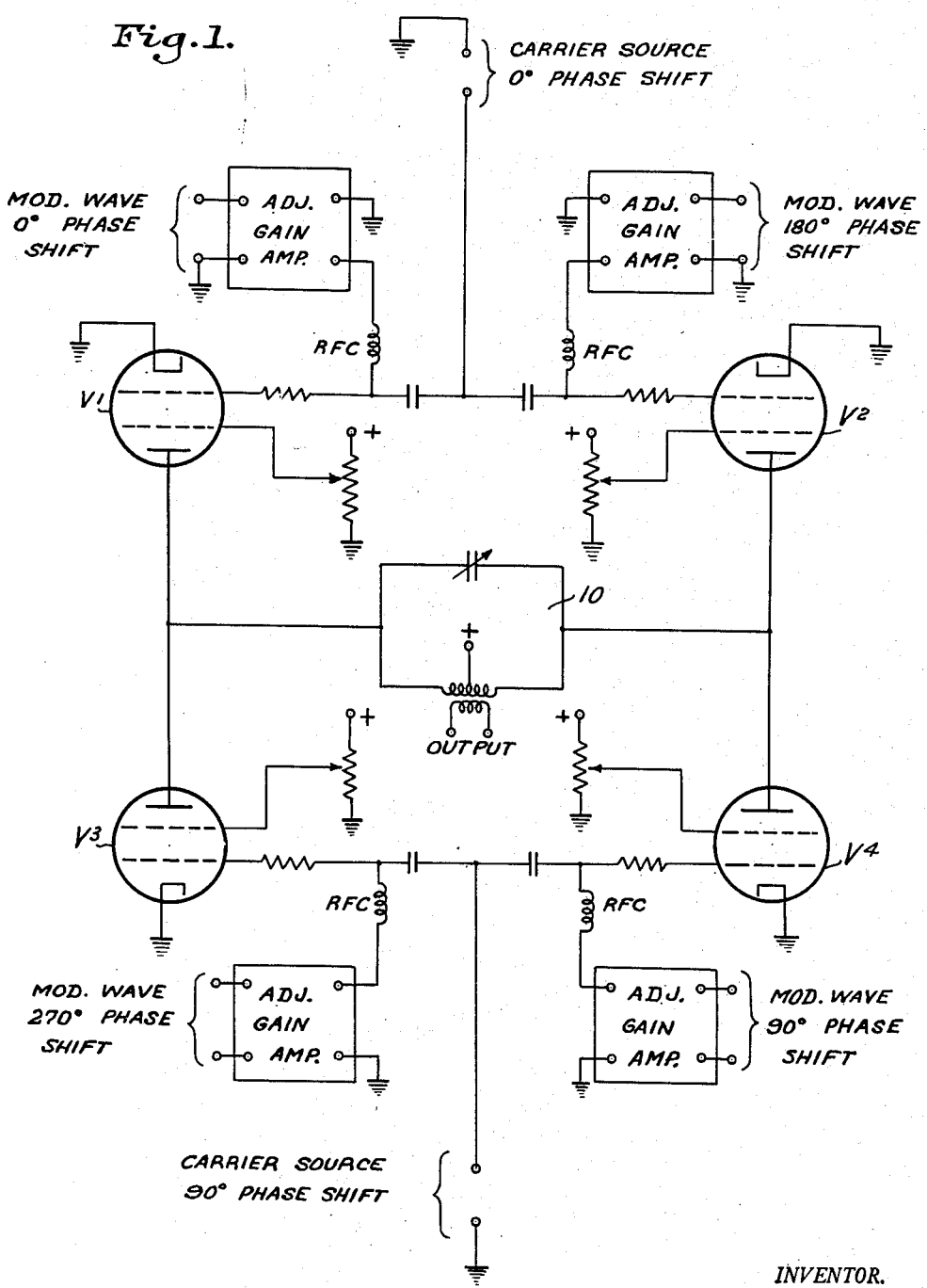

Nov. 10, 1953  J. F. HONEY  2,659,050
ALIGNMENT INDICATOR

Filed April 29, 1952  3 Sheets-Sheet 2

INVENTOR.
JOHN F. HONEY
BY
Harry M. Saragovitz
ATTORNEY

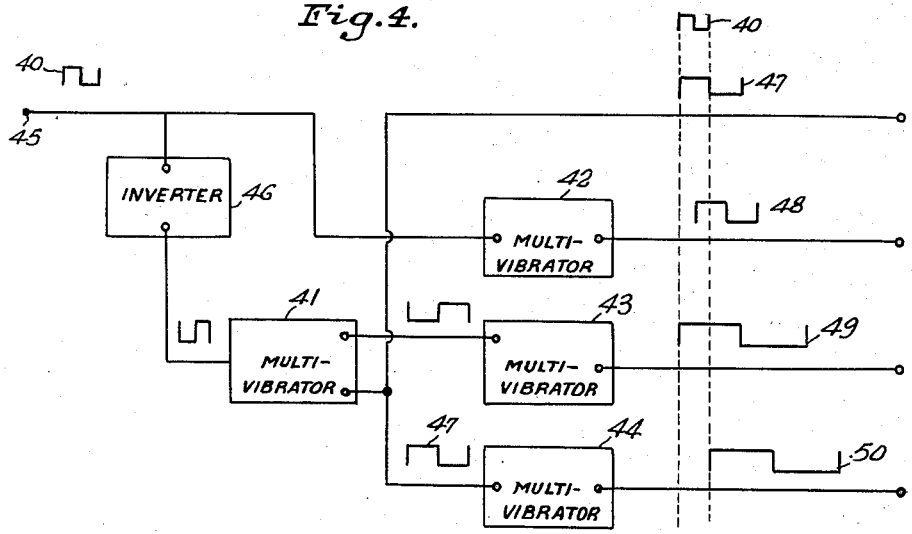
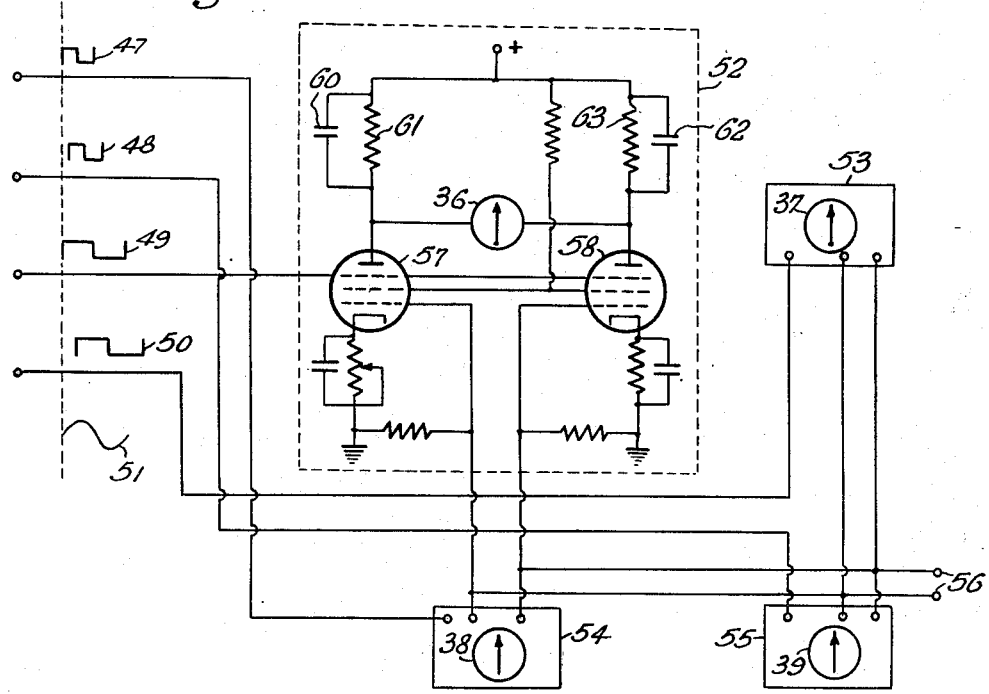

Patented Nov. 10, 1953

2,659,050

UNITED STATES PATENT OFFICE 2,659,050

ALIGNMENT INDICATOR

John F. Honey, Menlo Park, Calif., assignor to the United States of America as represented by the Secretary of the Army Application April 29, 1952, Serial No. 285,031

9 Claims. (Cl. 332—45)

My invention relates to apparatus for indicating the state of adjustment of a double balanced modulating system.

A double balanced modulating system is frequently employed to generate a single sideband suppressed carrier wave. Such a modulating system comprises two balanced modulators of two tubes each. In each modulator, the carrier may be fed in phase to the two tubes, while the modulating wave is applied in push-pull. The carrier and modulating waves fed to one modulator are in quadrature respectively to the carrier and modulating waves fed to the other modulator. The plate currents of all four tubes develop power in a common plate tank circuit. When properly adjusted and operated, only one sideband is present in the output, the other sideband and the carrier being suppressed. In order for the modulating system to operate correctly, it is necessary, among other things, that all of the carrier and modulating waves be of the same amplitude, that the phase relationships be proper, and that the tubes have equal transconductances. The adjustment of a double balanced modulating system has heretofore been a delicate and tedious task.

It is an object of my invention to provide an apparatus which will indicate when the modulator is adjusted improperly.

It is a further object to provide an apparatus which will indicate the nature of the maladjustment.

It is another object to provide an apparatus which will aid in the adjustment of the modulator.

A more specific object is to provide an apparatus which will indicate an unbalance of the first modulator, an unbalance of the second modulator, and an unbalance of the two modulators with respect to each other.

In accordance with my invention, I provide means to generate and apply to the modulating system four signal waves ($f<0°$, $f<90°$, $f<180°$, and $f<270°$) of the same frequency but displaced in phase by 90°. The modulating system is provided with means to amplify each signal wave separately. Two suitable carrier waves of the same frequency and in phase quadrature are also applied to the system. The output of the system is detected, or rectified, and applied to the alignment indicator proper. The alignment indicator comprises four circuits, each of which indicates the presence of a certain wave form. The first indicates the presence of a wave of the form $f<0°$ or $f<180°$ and also indicates which wave form is present. Similarly, the second indicates $f<90°$ or $f<270°$; the third, $2f<0°$ or $2f<180°$; and the fourth $2f<90°$ or $2f<270°$. The modulating system is adjusted until all of these waves are eliminated from the output. The waves $f<0°$ and $f<180°$ may be eliminated from the output by adjusting the relative amplitudes of the applied waves $f<0°$ and $f<180°$. $f<90°$ and $f<270°$ may be eliminated by adjusting the relative amplitudes of the applied waves $f<90°$ and $f<270°$. These amplitude adjustments are made within the modulator, for example, by means of the adjustable gain amplifiers. $2f<0°$ and $2f<180°$ may be eliminated by adjusting the transconductance of one of the pairs of modulating tubes, for example by adjusting the screen voltages of both tubes in one modulator simultaneously in the same direction. $2f<90°$ and $2f<270°$ may be eliminated by adjusting the relative phase of the carrier waves applied to the two balanced modulators.

Figure 2:
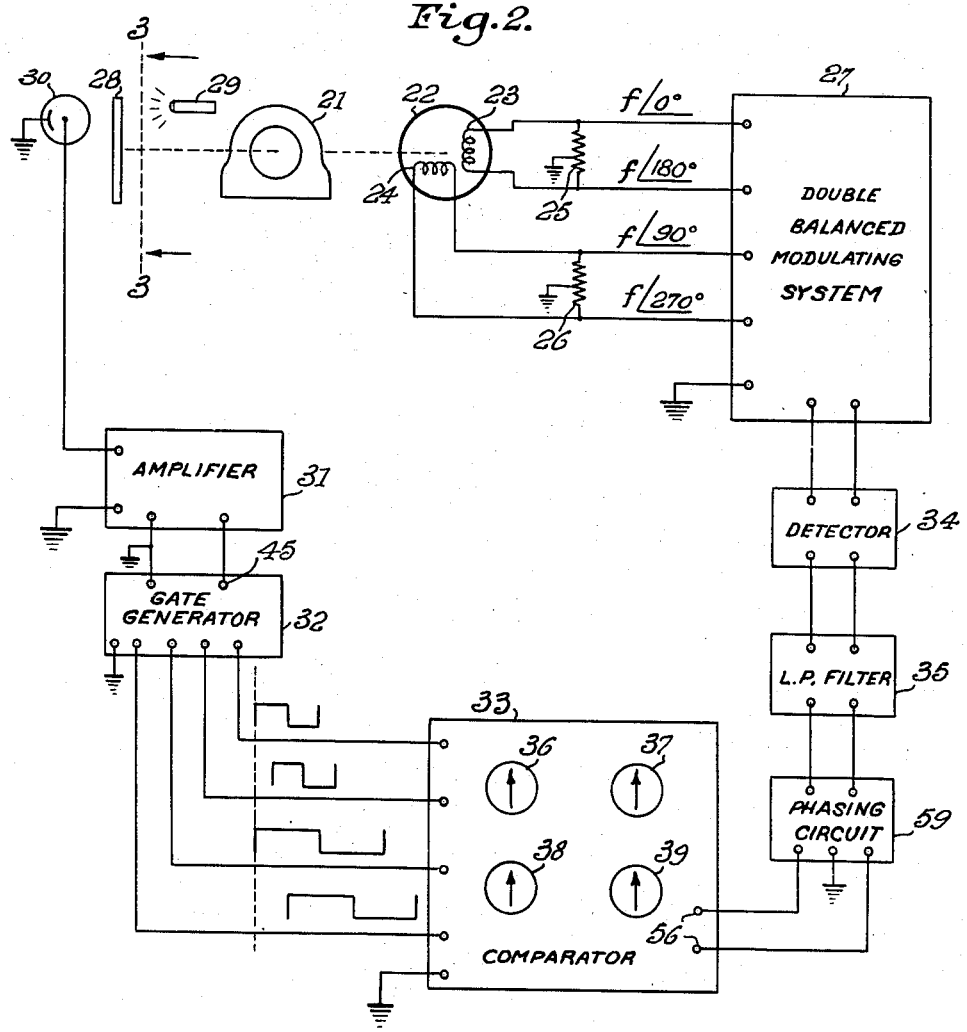
Figure 3:
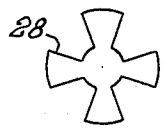

For a more complete understanding of the invention, reference may be had to the accompanying drawing, in which Fig. 1 is a simplified schematic diagram of a double balanced modulating system for suppressing the carrier and one side band; Fig. 2 is a diagram of the alignment indicator and its connections to the modulating system of Figure 1; Fig. 3 is a view in elevation of the light chopping disc, taken along the line 3—3 of Fig. 2; Fig. 4 is a block diagram of the gate generator; and Fig. 5 is a diagram of the phase and frequency comparator.

In Fig. 1 there is shown a simplified diagram of a double balanced modulating system, such as may be adjusted with the aid of the invention. Such a modulating system is normally a component of a single sideband transmitter. Such a transmitter is normally equipped with means for dividing the signal wave into four components displaced in phase 90° from each other. The transmitter also includes a source of carrier frequency and means to divide the carrier into two portions displaced in phase by 90° from each other. The modulating system illustrated in Fig. 1 forms no part of the instant invention, and a detailed discussion of its operation is believed to be unnecessary. However, it may be stated briefly that tubes V1 and V2 form one balanced modulator. When supplied with modulating and carrier waves as shown in the drawing, the common plate circuit 10 of these tubes will contain both sidebands, while the carrier will be suppressed. Tubes V3 and V4 form another balanced modulator. The plate circuit of these tubes likewise contains both sidebands but no carrier. When the modulator of tubes V1 and V2 is connected as shown with the modulator of tubes V3, V4, the result will be the cancellation of one of the sidebands in the common plate tank circuit.

Consider the output of a transmitter such as described above, including the modulating system of Fig. 1, when subject to modulation of a single tone of frequency $f$. The transmitter will divide the single tone into four tones of the same frequency, $f$, but shifted in phase by 0°, 90°, 180°, and 270°. Under these conditions, if the transmitter is properly adjusted, the output appearing in the plate circuit will be a pure sine wave of constant amplitude. However, if there are any unbalances in the voltages fed to the balanced modulators, or if the tube characteristics differ from one another, or if these characteristics are non-linear with modulating level, the output will be other than a single sine wave. In a detected or rectified version of the transmitter output, there will appear a frequency equal to that of the modulating tone if either or both of the modulators are operating in an unbalanced fashion. The output will then contain carrier as well as the wanted sideband. For example, if tubes V1 and V2 are not balanced, the rectified output will contain a wave of frequency $f$ whose phase is either 0° or 180°, depending on the direction of the unbalance. If tubes V3 and V4 are not balanced, the output will contain a wave of frequency $f$, displaced in phase by either 90° or 270°. These unbalances can come about in two main ways in the system under consideration. The first is by virtue of an unbalance in the modulating voltage, while the second is through unequal transconductances in the two tubes. An inequality between the outputs of the two balanced modulators (V1, V2 not balanced with respect to V3, V4) results in the appearance of unwanted sideband. This inequality can arise in any of four ways: (1) unequal carrier drive, (2) unequal modulating voltages, (3) inequality of pair of tube transconductances, and (4) departure from quadrature phase of the carrier drive. The first three misalignments give rise in the detected output of the transmitter to a sine wave of twice the frequency of the modulating tone. Lack of proper carrier phase will result in a similar double-frequency sine wave, but in quadrature with the first.

Lack of perfect linearity in the transconductance of the tubes with modulating wave level will cause the appearance of a sine wave component in the detected output having a frequency four times that of the modulating tone. This is due to the cyclical operation of the four tubes throughout the modulating wave period.

It is seen, therefore, that with each of a given set of misalignments there may be associated specific signals in the detected output. A device which wouldd indicate the presence of each of these signals would be a great aid in adjusting the modulating system. The alignment indicator about to be described will indicate the presence of all of the aforementioned signals except the $4f$ signal due to lack of linearity in the transconductance with modulating wave amplitude.

Fig. 2 is a diagram of the alignment indicator. It is essentially a single frequency test source of four quadrature modulating voltages and four gated phase and frequency sensitive detectors, each one of which is assigned to the exclusive examination of one of the components in the detected output of the transmitter.

As shown in Fig. 2, an electric motor 21 drives a two phase generator 22. Windings 23 and 24 of generator 22 are shunted by resistors 25 and 26 respectively which are grounded at their center points. Thus generator 22 provides an output of four waves of the same frequency displaced in phase by 90° with respect to each other. This output is connected to the modulating system 27.

Also connected to the shaft of motor 21 is a four bladed disc 28. Disc 28 is interposed between a light source 29 and a photoelectric cell 30. Disc 28 is shaped as shown in Fig. 3 so that the output of photocell 30 is a square wave whose frequency ($4f$) is four times that of the output of generator 22. This square wave is amplified by amplifier 31 and fed to gate generator 32.

Gate generator 32, to be more fully described subsequently, generates four square waves. The first has a frequency ($2f$) twice that of generator 22. The second has the same frequency, but is displaced in phase by 90° from the first. The third and fourth have a frequency ($f$) equal to that of generator 22, the fourth being displaced in phase by 90° from the third. These four waves are applied to comparator 33.

The output of modulating system 27 is rectified by detector 34 and passed through low pass filter 35, which takes out the $4f$ component which arises from the tube non-linearity in the balanced modulators. The signal then passes through phasing circuit 59, which converts the signal into two balanced voltages, displaced in phase by 180°. Circuit 59 may, for example, comprise a transformer with a center tapped secondary winding or may comprise an electronic phase inverter. The output of circuit 59 is also fed to comparator 33. Comparator 33, to be more fully described subsequently, comprises four similar phase and frequency sensitive circuits. All four circuits are supplied with the output from phasing circuit 59. Each circuit is gated by one of the square waves from gate generator 32. Each circuit includes one of the zero-center micro-ammeters 36, 37, 38, or 39. Meter 36 indicates the presence of a wave of the form $f<0°$ or $f<180°$, depending upon the direction of the deflection. Similarly, meters 37, 38, and 39 indicate respectively the presence of waves of the forms $f<90°$ or $f<270°$, $2f<0°$ or $2f<180°$ and $2f<90°$ or $2f<270°$.

Gate generator 32 is illustrated in block diagram form in Fig. 4. This generator comprises four conventional bistable multivibrators, 41, 42, 43, and 44. Each multivibrator goes through one half of a cycle for each applied trigger. The triggers are applied to the grids of both tubes through diodes in the conventional manner so that only negative triggers are effective. Triggers from amplifier 31 of the form illustrated by wave 40 are fed into the generator at terminal 45. These triggers are applied directly to multivibrator 42, which therefore generates a wave of the form shown by curve 48, whose frequency is one half that of wave 40. The positive-going portion of wave 48 occurs at the same time as the negative-going portion of wave 40. The form of wave 40 is repeated at the right of Fig. 4 for convenience. Wave 40 is also passed through inverter 46 and applied to multivibrator 41. Two outputs are taken from multivibrator 41, one from the plate circuit of each tube. These outputs are, of course, 180° out of phase with each other. One output, of the form of wave 47, is led directly to the output of generator 32 and also feeds multivibrator 44. The output of multivibrator 44 has the form shown by wave 50. The other output of multivibrator 41 triggers multivibrator 43, whose output has the form indicated by wave 49. Output waves 47, 48, 49, and 50 are used to gate the indicating circuits of comparator 33.

Comparator 33 is shown diagrammatically in Fig. 5. It comprises four identical phase and frequency sensitive circuits 52, 53, 54, and 55, of which circuit 52 only is shown in detail. The detected output of the modulating system is fed through low pass filter 35 and phasing circuit 59 (shown in Fig. 2) through terminals 56 to each circuit. Each circuit is gated with one of the wave forms generated by gate generator 32.

Comparator circuit 52 is a phase and frequency sensitive circuit which compares the phase and frequency of one wave with the phase and frequency of a reference wave. In the embodiment illustrated, the reference wave is a square wave. If the applied wave has certain phase and frequency relationships with the reference wave, an indicator, such as meter 36, is deflected. If the applied wave has certain other phase and frequency relationships with the reference wave, no deflection of meter 36 occurs.

Comparator circuit 52 comprises two tubes 57 and 58, preferably pentodes. The control grids are supplied in push-pull with the wave to be compared, in this case the output of the modulating system.

The anodes and screens are supplied from any suitable source of positive potential. Each anode circuit contains a resistor-condenser combination, 60—61, 62—63 which provides a time constant long with respect to the signal applied to the grids. A zero-center micro-ammeter 36 is connected between the two anodes. It is obvious that if no gating wave were applied to the suppressor grids of tubes 57 and 58, that a balanced signal applied to the grids would, during one half cycle, cause tube 57 to conduct more than tube 58, and during the next half cycle, would cause tube 58 to conduct more than tube 57. The average potential of both anodes would be the same, and no deflection would appear on meter 36. Actually, the suppressor grids of tubes 57 and 58 are supplied with a reference, or gating, wave of the form shown at 49, of sufficient magnitude to cut off tubes 57 and 58 during the negative portions. If a wave of the form shown at 51, which is exactly in phase with the gating wave, be applied to the control grids, then one tube, for example tube 57, will conduct more while tube 58 will conduct less, during the positive half cycle. During the negative half cycle, neither tube will conduct. The anode of tube 58 will therefore be at a higher potential than the anode of tube 57, and meter 36 will be deflected. If a wave 180° out of phase with wave 51 be applied, meter 36 will deflect in the opposite direction.

An inspection of the wave forms shown at the left of Fig. 5 shows that detectors 53, 54, and 55, which are gated by waves 47, 48, and 50, respectively, will be insensitive to waves such as 51. Detector 53, for example, is gated by wave 50. During the first quarter cycle of wave 51, neither tube will conduct. During the second quarter cycle, the first tube in detector 53 will conduct more than the second. During the third quarter cycle, the second tube will conduct more than the first. During the fourth quarter cycle, neither tube will conduct. Thus the average conduction of the two tubes will be the same and there will be no potential difference between the anodes. A similar analysis shows that detector 52 is insensitive to waves in phase with any of wages 47, 48, and 50. In general, if a square wave of frequency $f$ be applied to the suppressor grids of circuit 52, various waves applied to the control grids in push-pull will have the following effects:

1. An applied wave of frequency $f$ which is either 90 or 270 degrees out of phase with the square wave will cause no indication on meter 36.
2. An applied wave of frequency $f$ with any other phase relationship will cause meter 36 to deflect.
3. The maximum deflection will occur when the applied wave is either in phase or 180 degrees out of phase.
4. The direction of the deflection indicates whether the applied wave is in phase or 180 degrees out of phase with the gating wave.
5. An applied wave of frequency $2f$ and any phase relationship will cause no deflection of meter 36.
6. An applied wave of frequency $$\frac{f}{2}$$

and any phase relationship will cause no deflection of meter 36.

It is therefore seen that although the detected output of modulating system 27 is applied in parallel to all of the circuits 52, 53, 54, and 55, each circuit is sensitive to but one component.

The procedure followed in aligning a transmitter using a modulating system such as shown in Fig. 1 will be outlined. First, the screen voltages of tubes V1, V2, V3, and V4 should be set equal. The amplitude of the two carrier waves should be set equal. Modulation should be applied, and all four modulating voltages set equal. With the modulation removed, the screen voltages of tubes V1 and V2 should be adjusted for minimum carrier plate voltage. This adjustment is then repeated for tubes V3 and V4. The alignment indicator is then connected as shown in Fig. 2.

A deflection of any or all of meters 36, 37, 38, and 39 shows that the modulator is not properly adjusted. A deflection of meter 36 shows that modulator V1, V2 is unbalanced. Since the transconductance of the tubes has already been adjusted, meter 36 should be zeroed by adjusting the relative amplitudes of the modulating waves applied to tubes V1 and V2 by means of the adjustable gain amplifiers in the modulating unit. Similarly, meter 36 should be zeroed by adjusting the relative amplitude of the modulating waves applied to tubes V3 and V4. The presence of unwanted sideband, as indicated by meter 38, should be corrected by adjusting the screen voltage of one of the pairs of tubes (V1 and V2 or V3 and V4) simultaneously in the same direction. The relative phase of the two carrier waves should be adjusted until meter 39 is zeroed.

The invention may also be used to test a single balanced modulator. If tubes V3 and V4 be omitted from the circuit of Fig. 1, tubes V1 and V2 would comprise a balanced modulator whose output would contain both side bands but no carrier. To test such a modulator by means of the invention, a single tone is applied in push pull to the modulator. A single square wave, in phase with the tone applied to one grid, is generated. A single circuit, such a circuit 52 shown in Fig. 5, is used to compare the detected output of the modulator with the square wave.

Unbalance is indicated by a deflection of meter 36.

From the foregoing description it will be apparent that I have provided an apparatus which makes it possible to adjust a double balanced modulator quickly and accurately. While a preferred embodiment has been described, many modifications within the scope of the invention may be made. For example, the four modulating tones could be obtained from an electronic oscillator and suitable phasing networks, instead of from the two phase generators 22 illustrated in Fig. 2. If such an arrangement were used, a frequency doubling circuit could be provided to generate the 4f wave applied to gate generator 32, instead of the light source and photocell arrangement illustrated. As another example, gate generator 32 could be replaced by four suitably shaped discs and four photocells, each of which would generate one of the required square waves. Many other modifications within the scope of the invention will occur to those skilled in the art.

I claim:

1. Apparatus for indicating the state of adjustment of a single side band modulating system comprising: means for generating four signal voltages of the same frequency but displaced in phase by 90 degrees with respect to each other; means for applying said voltages to the modulating system to be tested; means for detecting the output of the modulating system; means for generating a square wave of the same frequency and phase as one of said four voltages; and means for comparing the phase and frequency of the detected output of the modulating system with that of said square wave, the coincidence of phase and frequency of the detected output and said square wave being an indication of the presence of carrier in the output of said modulating system.

2. Apparatus for testing the adjustment of a two unit balanced modulating system of the type which produces a single side band output comprising: means for generating four modulating signal voltages of the same frequency but displaced in phase by 90 degrees with respect to each other; means for applying said signal voltages to the modulation input of said modulating system; means for detecting the output of said system; means for generating two square wave voltages of the same frequency as said signal voltages, one square wave voltage being in phase with one of said signal voltages, the other being in quadrature therewith; and means for comparing the phase and frequency of the components in the detected output with the phase and frequency of each of said square waves, phase and frequency coincidence with the first and second square waves indicating, respectively, unbalance of one or the other units of the balanced modulating system.

3. Apparatus for determining the state of adjustment of a modulating system of the type which normally produces a single sideband output, comprising: means for generating four signal voltages of the same frequency but displaced in phase by 90 degrees with respect to each other; means for applying said signal voltages to the modulation input of said system; means for rectifying the output of said system; and means for comparing the phase and frequency of the components in the detected output with the phase and frequency of each of said signal voltages.

4. Apparatus according to claim 3 in which the means for comparing the phase and frequency comprises means for generating a first voltage of square wave form of the same frequency and in phase with one of said signal voltages; means for generating a second voltage of square wave form of the same frequency as, but displaced in phase by 90 degrees from, said first voltage of square wave form; and means for comparing the phase and frequency of the components in the detected output with the phase and frequency of each of said voltages of square wave form.

5. Apparatus for testing the adjustment of a double balanced modulating system of the type which produces a single side band output comprising: means for generating four modulating signal voltages of the same frequency but displaced in phase by 90 degrees with respect to each other; means for applying said signal voltages to the modulation input of said modulating system; means for generating two square wave voltages of the same frequency as said signal voltages, the first being in phase with one of said signal voltages and the other displaced in phase therefrom by 90 degrees; means for generating two additional square wave voltages of twice the frequency of said signal voltages, said last mentioned voltages being in quadrature with each other; means for detecting the output of said modulating system; and means for comparing the phase and frequency of the components in the detected output with the phase and frequency of each of said square wave voltages, phase and frequency coincidence with each square wave indicating a distinct maladjustment of the system.

6. Apparatus for determining the maladjustment of a double balanced modulating system of the type which produces a single side band output comprising: means for generating first, second, third and fourth signal voltages of sine wave form and of the same frequency but displaced in phase by 90 degrees with respect to each other; means for applying said voltages to the modulation input of said system; means for rectifying the output of said system; means for generating fifth, sixth, seventh and eighth voltages of square wave form, said fifth voltage being of the same frequency and phase as said first voltage, said sixth voltage being of the same frequency as said fifth voltage but displaced in phase therefrom by 90 degrees, said seventh voltage being of twice the frequency of said fifth voltage, the rises in potential of said seventh voltage being coincident in time with the rises and falls of potential of said fifth voltage, said eighth voltage being of the same frequency as said seventh voltage but displaced in phase by 90 degrees therefrom; and means for comparing the phase and frequency of the components in the rectified output of said system with that of each of said voltages of square wave form, phase and frequency coincidence with each square wave indicating a specific maladjustment.

7. Apparatus for testing the adjustment of a balanced modulator of the type which suppresses the carrier comprising: means for generating a modulating voltage; means for applying said voltage to the modulation input of the modulator; means for rectifying the output of the modulator; and means for analyzing the rectified output of the modulator to determine whether it contains a component of the same frequency and in phase with said modulating voltage.

8. Apparatus for testing the adjustment of a balanced modulator of the type which suppresses the carrier comprising: means for generating a signal voltage; means for applying said signal voltage to the modulation input of said modulator; means for rectifying the output of said modulator; and means for comparing the phase and frequency of the components in the rectified output with the phase and frequency of said signal voltage, phase and frequency coincidence being an indication of unbalance of said modulator.

9. Apparatus for testing the adjustment of a balanced modulator of the type which suppresses the carrier comprising: means for generating a modulating tone, means for applying said tone to the modulator, means for detecting the output of said modulator, means for generating a square wave in phase with said modulating tone, and means to compare the phase and frequency of the detected output with that of said square wave, the coincidence of the phase and frequency being an indication of unbalance of the modulator.

JOHN F. HONEY.

References Cited in the file of this patent

UNITED STATES PATENTS

| Number | Name | Date |
|---|---|---|
| 2,470,412 | Piety | May 17, 1949 |
| 2,576,059 | Wojciechowski | Nov. 20, 1951 |